United States Patent [19]

Boyd

[11] 4,028,194

[45] June 7, 1977

[54] SYSTEMATIZED METHOD AND CONTROL OF FRACTIONATION HEAT BALANCE

[75] Inventor: David M. Boyd, Claredon Hills, Ill.

[73] Assignee: UOP Inc., Des Plaines, Ill.

[22] Filed: Dec. 29, 1975

[21] Appl. No.: 644,988

[52] U.S. Cl. ............................ 203/2; 203/DIG. 18; 202/160; 202/206; 235/151.12

[51] Int. Cl.² ......................................... B01D 3/42

[58] Field of Search ............... 203/2, DIG. 18, 1, 3; 202/206, 160; 196/132; 235/151.12

[56] References Cited

UNITED STATES PATENTS

| | | | |
|---|---|---|---|
| 2,580,651 | 1/1952 | Boyd | 203/2 |
| 2,684,326 | 7/1954 | Boyd | 203/2 |
| 3,464,895 | 9/1969 | Boyd | 203/2 |
| 3,619,377 | 11/1971 | Palmer | 203/2 |
| 3,773,627 | 11/1973 | Weber | 203/2 |
| 3,830,698 | 8/1974 | Kleiss | 202/206 |
| 3,855,074 | 12/1974 | Mosler et al. | 202/206 |

Primary Examiner—Wilbur L. Bascomb, Jr.

Attorney, Agent, or Firm—James R. Hoatson, Jr.; Robert W. Erickson; William H. Page, II

[57] ABSTRACT

Heat balance of a fractionation column is controlled and maintained by obtaining three differential temperatures between selected temperature-sensing points along the height of the column. A signal representing one of the delta-T's is employed in regulating the quantity of reflux returned to the rectification zone. The remaining two delta-T's are conjunctively utilized to regulate the enthalpy (heat-input content) of the reboiled liquid bottoms stream being returned to the reboiler section of the column. With respect to the latter, a selected one of the two delta-T signals is multiplied by a multiplier representing the ratio of the number of trays between the temperature sensing points supplying the non-selected delta-T signal to the number of trays between the temperature sensing points supplying the selected delta-T signal. A signal representing the resulting product is correlated with the non-selected signal, and the signal representing the resulting relationship is utilized to regulate the degree to which the returned liquid bottoms material is vaporized.

7 Claims, 1 Drawing Figure

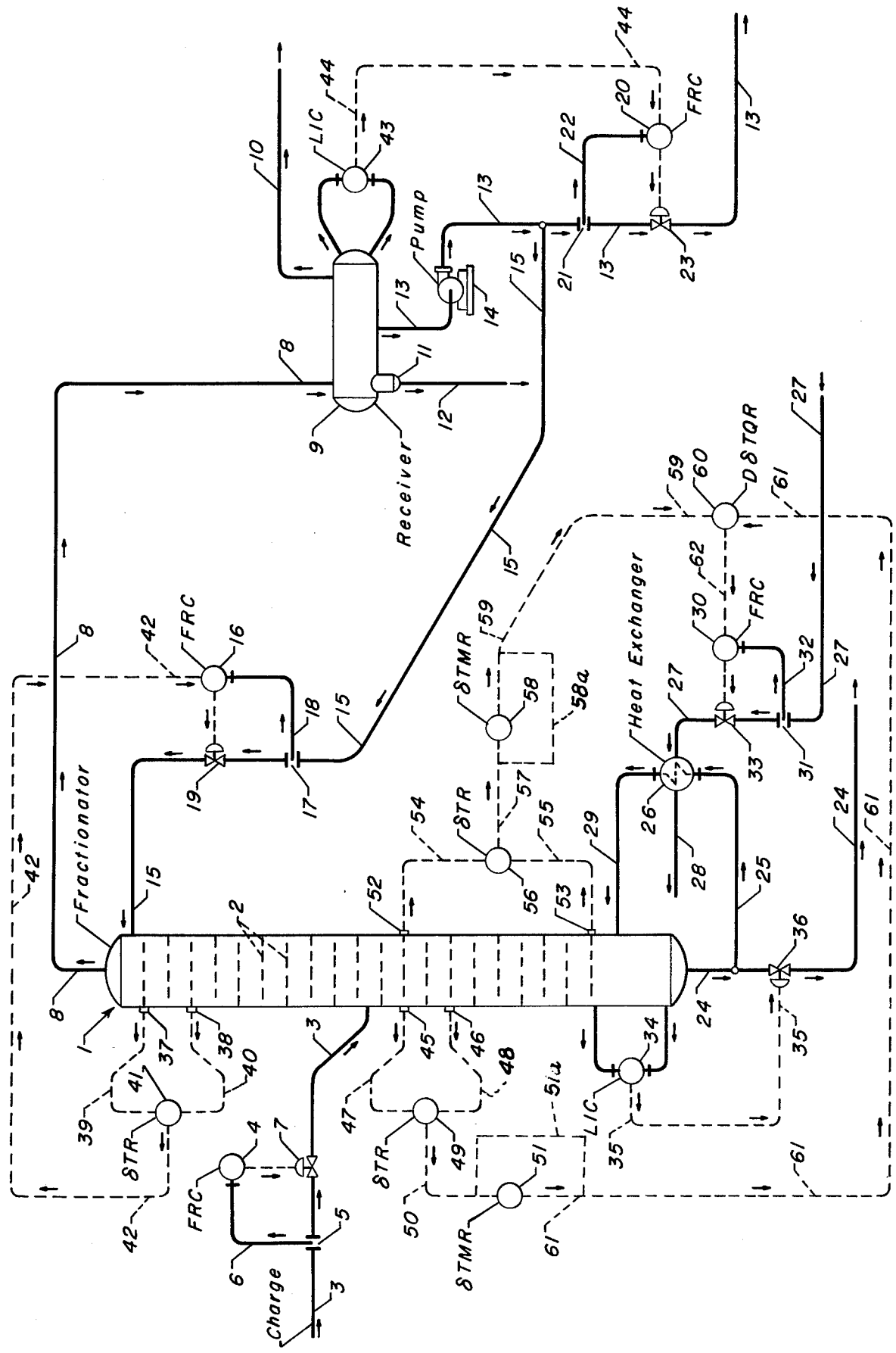

SYSTEMATIZED METHOD AND CONTROL OF FRACTIONATION HEAT BALANCE

APPLICABILITY OF INVENTION

My inventive concept, as herein more fully described, encompasses a control system and method for maintaining the heat balance of a fractionation column functioning to separate a mixed-component feed stream. The invention is especially applicable in those situations where the intended product stream is characterized as a substantially-pure component —— e.g., the overhead recovery of benzene from a mixture thereof with other aromatic hydrocarbons. The fractionation column must be maintained in heat balance in order to obtain the specified product composition, whether a bottoms product, overhead product, side-cut product, or where both bottoms and overhead product compositions are specified. For example, in recovering benzene from a mixture thereof with toluene and the various xylenes, proper heat balance control will result in a substantially-pure overhead benzene stream and, simultaneously, minimal benzene in the net liquid bottoms product.

In the present specification, as well as the appended claims, the use of the term "fractionation column" synonymously alludes to "rerun column", "distillation column", "stripping column", etc. In the more common separation-via-fractionation technique, a mixed, or multi-component feed stream is introduced intermediate the ends of the column, and generally at about its mid-point. Fractionation columns are vertically-disposed cylindrical chambers having a plurality of spaced-apart trays or decks which provide the necessary intimate mixing of countercurrently-flowing liquid and vapors. Heat is supplied to the column through the use of a reboiler heater, or heat-exchanger communicating with the lower reboiler section. The reboiler section contains an inventory of liquid bottoms material, generally maintained by way of suitable liquid-level control, and a portion thereof is withdrawn, partially vaporized in the reboiler heater, and returned to the column generally at a point just below the lowermost tray. Reflux is supplied to the column by condensing an overhead product stream and returning a portion thereof through a locus above the uppermost tray, or deck. These two streams, the reflux and reboiled bottoms liquid, constitute the two major factors considered in the heat balance of the column, the remainder being the feed stream introduced and the product streams leaving the column.

Although understood by those skilled in the art of separation by way of fractionation, the definition of several additional terms is believed to be warranted. The "reboiler section" of a distillation column is that portion below the lowermost tray, while the "fractionation section" is that portion of the column above the lowermost tray. The "stripping section" includes those trays between the lowermost tray and locus of feed introduction, while the "rectification section" refers to those trays above the locus of feed introduction. Also, the terms "heat-input" and "heat-input content" of a given stream, allude to enthalpy and are intended to connote the quantity of energy, per unit of time, introduced into or removed from the column by a given stream, whether returned to the column at a lower temperature (reflux), or a higher temperature (partially vaporized reboiled liquid). For example, considering the feed stream, at a given composition and temperature, it will have a given enthalpy expressed as BTU/lb. Depending upon its flow rate, expressed as lb./hr., it will supply a given heat-input to the column expressed as BTU/hr. Any change in temperature, flow rate or composition will change the enthalpy thereof. Likewise, a change in the flow rate of the reflux stream will affect its contribution of enthalpy. With respect to the reboiled liquid bottoms, its enthalpy contribution may be varied via its flow rate, or the flow rate of the heat-exchange medium employed to partially vaporize it. Although many variables, relevant to the feed stream, reflux stream, returned vaporized bottoms liquid and recovered product streams, have an affect upon the thermal balance of the column, perhaps the most pronounced is the effect of the heat-input by way of the reboiler section. This particular source of enthalpy takes two forms: ($i$) the increased sensible heat of the liquid returned to the reboiler section and, ($ii$) the latent heat of vaporization contained in the vapors generated in the reboiler heater. Since the latter constitutes the source of greatest quantity of heat-input, it must necessarily be subject to control and/or regulation. Furthermore, since overall separation efficiency is largely dependent upon heat-input to the reboiler section and the flow rate of reflux to the rectification section, any thermal balance control system and method must take into account those loci within the fractionation column where the effect of varied reboiler section heat-input and reflux rates are most pronounced and immediate. The present invention directs itself to such a control system and method, while simultaneously considering the pressure drop effect as determined by the number of trays between the two pairs of vertically-spaced temperature-sensing points below the feed locus, the signals from which are ultimately utilized to regulate the heat-input to the reboiler section of the column.

The present invention is utilized to maintain a specified composition, or a composition characteristic of a product stream withdrawn from one end of a distillation column, whether the desired product constitutes the overhead stream, the bottoms liquid or both. Distillation techniques are extensively employed throughout the petroleum and petrochemical industries for the separation and recovery of select fractions of the charge stock, or of substantially pure compounds, and the adaptability thereto of the present control system and distillation method will be recognized by those having the requisite skill in the appropriate art.

OBJECTS AND EMBODIMENTS

A principal object of my invention is to provide an efficient method for fractionating a feed stream having mixed components. A corollary objective is directed toward maintaining a fractionation column in thermal balance.

More specifically, it is an object of the present invention to afford a control system which maintains thermal balance while simultaneously enhancing sepration efficiency.

Briefly, these objects are obtained by sensing six temperatures at selected points throughout the height of the column. The six temperatures are segregated into three specific pairs, each of which is employed to measure a temperature differential (delta-T) between two vertically-spaced points. The first pair of temperature sensing means are vertically-spaced below the feed of locus (or feed tray) and both are proximate thereto; a signal representative of the delta-T between these points is generated. A second pair of temperature sensors are vertically-spaced below the locus of feed introduction; one of these sensors is proximate to the feed locus while the other is proximate to the locus through which the partially vaporized liquid bottoms material is returned to the reboiler section of the column, and a signal representative of the delta-T between these two remote points is generated. A selected one of these first and second signals is transmitted to multiplying means wherein it is acted upon by a multiplier, and a signal representative of the resulting product is generated. The multiplier represents the ratio of the number of trays between the sensors supplying the non-selected delta-T signal to the number of trays between the sensors supplying the selected delta-T signal. A computed relationship of this third signal and the signal representing the non-selected delta-T is obtained, and another signal is utilized to regulate the enthalpy, or heat-input of the reboiler bottom liquid portion which is partially vaporized and returned to the reboiler section. The third pair of temperature sensors is vertically-spaced above the feed locus, and both are proximate to the locus through which the reflux is returned to the rectification section. A signal representing the delta-T is utilized to regulate the flow rate of the reflux stream. As hereinafter indicated, this control system is not found in the appropriate prior art.

One embodiment of my invention, therefore, directs itself to a control system intended for utilization in a fractionation column containing a plurality of spaced-apart trays or decks, and wherein (i) a feed stream is introduced through a locus intermediate the top and bottom thereof; (ii) liquid bottoms material is recovered from the lower end of said column, and at least a portion thereof prtially vaporized and returned to the reboiler section; and (iii) overhead material is recovered from the upper end of said column, condensed and at least a portion thereof returned to the rectification section as a reflux stream, which control system comprises, in cooperative combination: (a) a first pair of vertically-spaced temprature sensors below said feed locus and separated by a plurality of trays, and a first differential-temperature measuring device communicating with said first pair of temperature sensors; (b) a second pair of vertically-spaced temperature sensors below said feed locus and separated by a greater plurality of trays than said first pair; and a second differential-temperature-measuring device communicating with said second pair of temperature sensors; (c) first differential-temperature computing means communicating with a selected one of said first and second delta-T measuring devices; (d) second differential-temperature computing means communicating with said first computing means and the non-selected delta-T measuring device, and, co-acting with first control means for regulating the degree of vaporization of said liquid bottoms material returned to the reboiler section; (e) a third pair of vertically-spaced temperature sensors above said feed locus; and, (f) a third differential-temperature measuring device communicating with said third pair of temperature sensors and co-acting with second control means for regulating the quantity of reflux returned to said rectification section.

With respect to the techniques employed in recovering an overhead product stream from, and introducing reflux to the rectification section of a distillation column, my invention is intended to be adapted as hereinbelow stated. First, a single vaporous overhead stream is recovered, condensed and introduced into a receiver from which the reflux portion is removed on flow control, the remainder being withdrawn as the net overhead product by way of liquid-level control within the overhead receiver. Conversely, the net overhead product may be recovered on flow control, with the remainder being withdrawn as the reflux portion in response to liquid-level control. Another technique involves withdrawing the overhead product as a liquid from a tray below the reflux return locus on flow control. The vaporous overhead stream is condensed, introduced into the receiver and refluxed in response to control of the liquid level therein.

Another embodiment of my invention is specifically directed toward a method for controlling a fractionation column, wherein (i) a feed stream is introduced through a locus intermediate the top and bottom thereof; (ii) liquid bottoms material is recovered from the lower end of said column, and at least a portion thereof is partially vaporized and returned to the reboiler section; and, (iii) vaporous overhead material is recovered from the upper end of said column, condensed and at least a portion thereof returned to the rectification section as a reflux stream, which method comprises the steps of: (a) sensing a first temperature differential between two vertically-spaced temperature sensing points below said feed locus, separated by a plurality of trays, measuring the resulting first delta-T and generating a first signal representative thereof; (b) sensing a second temperature differential between two vertically-spaced temperature sensing points below said feed locus, separated by a greater plurality of trays, measuring the resulting second delta-T and generating a second signal representative thereof; (c) multiplying a selected one of said first and second delta-T signals by a multiplier representing the ratio of the number of trays between the sensors supplying the non-selected delta-T to the number of trays between the sensors supplying said selected delta-T signal, and generating a third signal representing the resulting product; (d) obtaining a computed relationship of said third signal and said non-selected signal, and generating a fourth signal representative of the resulting computed relationship; (e) regulating the degree to which said liquid bottoms material is vaporized in response to said fourth signal; (f) sensing a third temperature differential between two vertically-spaced temperature sensing points above said feed locus, measuring the resulting third delta-T and generating a fifth signal representative thereof; and, (g) regulating the quantity of said returned reflux stream responsive to said fifth signal.

Other objects and embodiments, although not specifically delineated herein, will become evident from the following more detailed description of my invention, and the control system and fractionation technique which it encompasses.

PRIOR ART

Temperature control at some point within a distillation column, to maintain the product composition at that point, in conjunction with the regulation of the enthalpy of a stream introduced into the column, must be acknowleded as old in the art of separation via distillation. Generally, either the flow rate of the reflux stream, or the enthalpy of the partially vaporized bottoms material is regulated. The enthalpy of the feed stream is seldom subject to direct control. Similarly, it must be recognized that the published literature is replete with a myriad of techniques designed to afford some measure of control over some aspect of product separation in a fractionation zone. In view of the voluminous nature thereof, no attempt will be made herein to delineate exhaustively the appropriate prior art; a few typical illustrations will suffice. One prior art technique, now since improved upon, involves instituting an energy balance around the reboiler heater; a similar scheme computes the energy balance around the reboiler section of the column. While affording a measure of control, both techniques entail many measurements accompanied by a complex energy balance, and nonetheless are comparatively imprecise. Other techniques innvolve controlling the flow of fuel medium to the reboiler heater in response either to the temperature of the heated material returned to the reboiler section, or to the rate of mixed-phase flow.

Another prior art technique involves temperature measurement and control at the point from which the desired product stream is withdrawn, accompanied by regulation of either the heat-input at that point, or at some remote point. To illustrate, if the overhead product is specified as to some composition characteristic, the temperature at some proximate point is sensed and controlled either by regulating the heat-input to the reboiler section, or by adjusting the quantity of reflux to the rectification zone of the column.

Such basic techniques have since been improved upon as illustrated, for example, by the double differential-temperature control system found in U.S. Pat. No. 2,580,651 (Cl. 203-2), issued Jan. 1, 1952. Here the overhead product composition is specified and the temperature gradient within the column is monitored around the feed locus. A first delta-T is measured by two vertically-spaced temperature sensors above the feed locus, both of which are proximate thereto. A second delta-T is measured through the use of two vertically-spaced temperature sensors below the feed locus, both of which are also proximate thereto. Appropriate signals are transmitted to computing (summing) means which develops a signal representing the difference between the two delta-T's. This last signal is employed to adjust the heat-input to the reboiler section. Also disclosed is the fact that the reboiler section heat-input could be pre-set and the signal from the summing means employed to control the quantity of reflux to the rectification zone.

In U.S. Pat. No. 2,684,326 (Cl. 203-2), issued July 20, 1954, a similar technique is disclosed, wherein two delta-T's are measured, one above and one below the feed locus. Again, all four temperature sensors are located proximate to the feed locus and are employed to control the heat distribution at both ends of the column. In one embodiment, the double differential-temperature signal controls the reflux rate, while a single differential-temperature signal (from below the feed locus) controls the reboiler section heat-input. Alternatively, the single differential-temperature signal (from above the feed locus) regulates the reflux rate, whereas the double differential-temperature signal adjusts the heat-input to the reboiler section.

More recently, U.S. Pat. No. 3,464,895 (Cl. 203-2), issued Sept. 2, 1969, describes a differential-temperature control technique founded upon sensing six temperatures within the fractionation column. The specified product is an overhead stream, and one pair of vertically-spaced temperature senors measures the differential temperature within the rectification zone, between two points, one of which is immediately below the locus through which the reflux is returned, and the second of which is about five trays below the reflux locus. The signal representing the resulting temperature differential is utilized in adjusting the quantity of reflux returned to the column from the overhead receiver. All of the remaining four temperature sensors are situated below the feed tray, and are ultimately used to provide a signal which regulates the heat-input to the reboiler section. In accordance with the disclosed technique, the feed locus is immediately above tray 24 (out of 48 which are disposed in the column), and one pair of sensors is located at trays 25 and 28, providing a first delta-T; the second pair of temperature sensors are situated at trays 25 and 40, and provide a second delta-T which, in effect, brackets the first delta-T. The appropriate signals are transmitted to a computing relay which develops a signal representative of the quotient of the first delta-T divided by the second delta-T. It is this signal which is employed to adjust the heat-input to the reboiler section of the column. The present innvention expands upon this particular technique and affords a significant improvement therein.

None of these illustrated prior art schemes recognize the essence of the present invention wherein the pressure drop effect, determined by the number of trays between the two pairs of vertically-spaced temperature sensors below the feed locus, is considered in generating the signal regulating the heat-input to the reboiler section. In accordance with the present invention, a selected one of the two signals representing the two temperature differentials obtained below the feed locus is transmitted to a multiplying means wherein it is acted upon by a multiplier, and a signal representative of the resulting product is generated. The multiplier represents the ratio of number of trays between the sensors supplying the non-selected delta-T signal to the number of trays between the sensors supplying the selected delta-T signal. A computed relationship of this third signal and that signal representing the non-selected delta-T is obtained, and another signal representative thereof is utilized to regulate the enthalpy, or heat-input of the reboiler bottoms liquid portion which is partially vaporized and returned to the reboiler section.

SUMMARY OF INVENTION

The principle that the temperature of a boiling mixture, at constant pressure, is a direct function of its composition underlies control systems intended for use in distillation facilities. In basic form, a temperature at a selected point in the distillation column is controlled to maintain constant composition of the material at that point. Generally the selected temperature control point is located above the feed locus if it is desired to maintain overhead product composition, and below the feed locus if the specified composition characteristic is directed toward the bottoms product. In certain circumstances, however, the selected locus of the temperature control point inherently gives rise to a tradeoff between the sensitivity of control and the response time of the control system. For enhancement of control sensitivity, the temperature control point should be such that a relatively minor variation in product composition corresponds to a comparatively large temperature change at the control point. Conversely, in order to minimize the response time (lag time) of the system, the temperature control point should be close to the locus of immediate effect of the variable which is to be regulated. For example, if the reflux flow rate is to be adjusted by the temperature controller, it is preferable to locate the temperature sensing point in the upper section of the column, whereas, if the heat-input to the reboiler section is the regulated variable, the temperature sensing point should be a locus in the lower section of the column. Certainly, the differential-temperature control systems, hereinbefore set forth, have done much to improve upon the basic techniques outlined above, and have improved separation efficiency while improving the relationship between response time and control sensitivity. The control system and method of the present invention offers additional improvement with respect to sensitivity of control and further improve upon the efficiency of separation. This results not only from the selected locations for the various temperature-sensing points, of which there are six, resulting in three delta-T's, but also from considering the effect of differing total pressure drop between the pairs of temperature-sensing points, the signals from which are utilized to regulate the heat-input to the reboiler section.

As hereibefore stated, there are two major factors affecting the heat balance of a fractionation column. These are the overhead reflux and the partially vaporized liquid bottoms material returned to the reboiler section of the column. Of these, the major heat source is the partially vaporized bottoms material, generally considered as the driving force behind the distillation operation. In accordance with the present method of maintaining a fractionation column and thermal balance, the heat-input, or enthalpy of this stream is regulated by sensing two temperature gradients, or differentil temperatures below the feed locus. A first pair of temperature sensors is located proximate to the feed locus, and are vertically-spaced with one or more trays therebetween. Of the second pair of temperature sensors, also both below the feed locus, one is proximate to the feed tray while the second is proximate to the locus through which the partially vaporized bottoms material is returned to the reboiler section of the column, and thus effectively brackets the first pair of temperature sensors.

Each pair of temperature sensors communicates with a delta-T measuring device, and two signals, representing the two delta-T's are generated. A selected one of these two signals is transmitted to a computing means which multiplies the selected signal by a multipler. A third signal, representing the resulting product, is generated and transmitted to a second computing means along with the non-selected signal, and a computed relationship signal is generated. Preferably, the computed relationship signal represents a quotient in which the numerator is the signal obtained across the lesser number of trays. The multiplier employed is the ratio of the number of trays between the sensors supplying the non-selected signal to the number of trays between the sensors supplying the selected signal. The quotient-representing signal is employed to regulate the enthalpy of the reboiled liquid bottoms material returned to the reboiler section of the column.

To illustrate the forgoing, reference will be made to U.S. Pat. No. 3,464,895, hereinbefore described. In this system, $(\text{delta-T})_1$ is obtained across three trays and $(\text{delta-T})_2$ is measured across 15 trays. Where the multiplying means is communicating with the $(\text{delta-T})_1$ measuring device, the multiplier will be 15/3, or 5. Where the multiplying means communicates with the $(\text{delta-T})_2$ measuring device, the multiplier will be 3/15, or 0.2. In the former instance, the quotient relay will generate a signal representing the value of $(5)(\text{delta-T})_1/(\text{delta-T})_2$, while in the latter situation, the signal represents the value of $(\text{delta-T})_1/(0.2)(\text{delta-T})_2$. This technique minimizes the effect of the pressure drop caused by changing the vapor or liquid load in the column. The numerator and denominator of the control signal equation will have an equal amount of change caused by pressure drop across the trays.

In addition to considering the pressure drop effect as determined by the number of trays between the two pairs of vertically-spaced temperature sensors, this differential-temperature system reacts immediately to the effect of a change in feed stream enthalpy as well as any change in the liquid material downwardly flowing from the rectification section into the stripping section of the column. Also, since one of the temperature sensors is proximate to the locus through which the vaporized bottoms material is returned, the effect thereof, coupled with the effect which the feed stream induces, is immediately considered by the delta-T system. The adjustment of heat-input to the reboiler section is also virtually immediate, as contrasted to the relatively longer response time experienced if the controlled adjustment is delayed until the enthalpy change effect occurring immediately below the feed tray exerts an influence in, or proximate to the reboiler section.

The third pair of temperature sensors is vertically-spaced above the feed locus, and both are proximate to the locus through which the reflux is returned to the rectification section. A signal representing the measured delta-T is utilized to regulate the flow rate of the reflux stream. As hereinbefore stated, my invention is readily adaptable for integration with three of the more common techniques for conducting fractionation-type separations. Two of these involve initially withdrawing a single overhead vaporous stream which is condensed and introduced into an overhead receiver. In one technique, the reflux therefrom to the rectification zone is on flow control via the delta-T signal, while the overhead product stream is recovered responsive to changes in the liquid level within the receiver. The second technique is the reverse; that is, the rate of product withdrawal is regulated by the delta-T signal which causes the receiver level to fluctuate and thus affect the rate at which reflux is returned. In the third system, the overhead product system is withdrawn as a liquid from a tray below the reflux locus, the quantity thereof being regulated responsive to the delta-T flow control signal. Overhead vapors are separately recovered, obviously through a locus above the reflux, condensed, introduced into the overhead receiver and returned as reflux in response to the level of liquid in the receiver. In all three techniques, the quantity of reflux is regulated, either directly, or indirectly when the product withdrawal rate is regulated directly.

BRIEF DESCRIPTION OF DRAWING

In further describing the present control system and its method of operation, reference will be made to the accompanying drawing. It is understood that the drawing is presented solely for illustration purposes, and is not to be construed as limiting upon the scope and spirit of my invention as defined by the appended claims. Miscellaneous appurtenances, not required for a clear understanding of the inventive concept, have been eliminated, or reduced in number. Such items are well within the purview of one having the requisite skill in the appropriate art. Presented in the drawing is a fractionation column 1 containing a plurality of spaced-apart perforated trays 2, and having a feed conduit 3, a bottoms product conduit 24, an overhead vaporous material conduit 8 and a reflux return conduit 15.

DETAILED DESCRIPTION OF DRAWING

Referring now to the drawing, fractionator 1 is shown as having a plurality of spaced-apart trays, or decks 2. In this illustration, the feed stream introduced through line 3 is a mixture of benzene, toluene and the xylenes, with the intended separation being the recovery of a substantially pure benzene overhead product while simultaneously recovering a bottoms product substantially benzene-free. The flow rate of the feed stream in line 3 is monitored by flow recorder controller (FRC) 4 which receives an indication of the flow rate by way of metering means (orifice plate) 5 and conduit 6. The flow is compared to the rate required by the automatically adjustable setpoint of FRC 4 and an appropriate signal is transmitted to control valve 7, the opening thereof being adjusted in response thereto.

Vaporous overhead material is withdrawn through line 8, condensed and introduced thereby into overhead receiver 9. Lighter, non-condensable material is vented by way of line 10, and any water is removed from dipleg 11 by way of conduit 12. Condensed liquid overhead material is withdrawn by way of conduit 13 and pump 14, and a portion thereof is returned as reflux to fractionator 1 by way of line 15. The reflux flow rate through conduit 15 is controlled by flow recorder controller 16 which receives an indication of the actual flow rate by way of orifice plate 17 and conduit 18. The rate is compared to that required by the automatically adjustable setpoint of FRC 16, an appropriate signal is transmitted to control valve 19 and the opening thereof is adjusted responsively. Flow recorder controller (FRC) 20 monitors the rate of net overhead liquid product in line 13 through the use of orifice plate 21 and conduit 22. The actual rate is compared to that called for by the adjustable setpoint of FRC 20, and an appropriate signal is transmitted to control valve 23.

A portion of the liquid bottoms material in line 24 is diverted through line 25 and inroduced into a direct-fired heater, or heat-exchanger 26, wherein it is partially vaporized prior to being returned to distillation column 1 via conduit 29. The heat-exchange medium, which may be steam, hot oil, or a hotter internal process stream, is introduced by way of line 27, and exits heat-exchanger 26 through line 28. The flow rate of the heat-exchange medium in monitored by way of FRC 30 which receives an indication thereof by way of orifice plate 31 and conduit 32, and transmits an appropriate signal to control valve 33. The quantity of net liquid bottoms product, being recovered through line 24, is determined by the level of liquid in the reboiler section as sensed by Liquid Indicating Controller (LIC) 34; a signal is transmitted via instrument line 35 to adjust the opening of control valve 36.

Temperature sensors 37 and 38 are vertically-spaced above the feed tray and, in the present illustration, both are proximate to the locus through which the reflux stream is returned to the column via conduit 15. Sensors 37 and 38 communicate, by way of instrument lines 39 and 40 with Differential Temperature Recorder (dTR) 41, which generates and transmits a differential-temperature signal via line 42 to FRC 16. The adjustable setpoint of the latter is re-set and an appropriate adjustment is made in the opening of control valve 19, thereby regulating the rate of reflux return through conduit 15. Since the quantity of reflux being returned through line 15 influences the level of liquid within overhead receiver 9, LIC 43 is employed to sense the level changes and transmit a signal via line 44 to FRC 20, whereby the adjustable setpoint thereof is reset and an appropriate adjustment made in the opening of control valve 23.

Enthalpy changes of the feed stream in line 3, whether resulting from varied flow rate, temperature, composition or any combination of these, induce changes in the temperature gradient below the feed tray. These effects are sensed by temperature sensors 45, 46, 52 and 53, all of which are located below the feed tray. The first two sensors, 45 and 46, are both proximate to the feed tray and are vertically spaced-apart to sense the differential temperature, or temperature gradient at loci of the immediate effect of the feed stream changes. These temperature sensors communicate, via instrument lines 47 and 48, with Differential Temperature Recorder (dTR) 49 which measures the differential temperature and generates a signal representing this delta-T.

The second two temperature sensors, 52 and 53, are also vertically-spaced below the feed tray; as indicated in the drawing, sensor 52 is proximate to the feed locus, while sensor 53 is proximate to the locus through which the partially-vaporized reboiler liquid is returned. Although sensor 52 is shown as sensing the same tray temperature as sensor 45, this is neither essential, nor critical, but is preferred. Temperature sensor 53 is located above the lowermost tray, or deck, but not within the reboiler section itself. Therefore it senses any temperature change resulting from the greater source of heat-input, that of the latent heat of vaporization of the reboiled liquid bottoms return. Thus, the temperature sensed by sensors 52 and 53 are representative of the temperature differential, or gradient across virtually the entire stripping section and transmit appropriate signals via instrument lines 54 and 55 to Differential Temperature Recorder (dTR) 56 which measures the temperature differential and generates a signal representative thereof.

As a practical matter, a commercial system will generally be designed and constructed such that (dTR) 49 is capable of communicating, via instrument line 50, with Differential Temperature Multiplying Relay (dTMR) 51, and dTR 56 with dTMR 58 via instrument line 57. In practice, however, only one of the two multiplying relays will be operative; therefore, each will be supplied with a signal bypass. The signal bypass around differential temperature multiplying relay 51 is shown as shunt 51a and thus bypass around differential temperature multiplying relay 58 is shown as shunt 58a. In the illustrated system, it will be assumed that sensors 45 and 46 are spaced apart with two intervening trays, while sensors 52 and 53 are separated by sixteen trays, and that dTR 49 is co-active with dTMR 51. In accordance with the present inventive concept, the signal from dTR 49 will be multiplied by 8, and dTMR will transmit a signal representing the product, 8(delta-T)$_1$ via instrument line 61 to Double Differential Temperature Quotient Relay (DdTQR) 60. The signal from dTR 56 is by-passed around dTMR 58, and transmitted through instrument line 59 to DdTQR 60. The latter generates a signal representing the quotient of 8(delta-T)$_1$ divided by (delta-T)$_2$, and transmits this signal by way of instrument line 62 to FRC 30, the setpoint of which is adjusted accordingly; a signal representing any difference between the flow rate of the heating medium in line 27 and the adjusted setpoint is transmitted to control valve 37. In this manner, the enthalpy of the partially vaporized reboiler bottoms liquid return is virtually immediately adjusted responsive to the varied delta-T comparisons proximate to the feed locus and across the entire stripping section, altering the heat-input to compensate for a change in the feed stream enthalpy. The use of a quotient relay is preferred to either the sum or difference in the delta-T's, since it facilitates accurate control of the slope of the distillation curve below the feed locus. Use of a multiplying relay on one of the two signals permits the consideration of the pressure drop effect as determined by number of trays between the two pairs of temperature sensors.

The foregoing clearly illustrates the present control system for maintaining product quality and thermal balance within a fractionation column, and the method by which it is used.

I claim as my invention:

1. In a fractionation column containing a plurality of spaced-apart trays or decks, and wherein (i) a feed stream is introduced through a locus intermediate the top and bottom thereof; (ii) liquid bottoms material is recovered from the lower end of said column, and at least a portion thereof partially vaporized and returned to the reboiler section; and, (iii) overhead material is recovered from the upper end of said column, condensed and at least a portion thereof returned to the rectification section as a reflux stream, the control system which comprises, in cooperative combination:
   a. a first pair of vertically-spaced temperature sensors below and proximate to said feed locus, said pair separated by a first plurality of trays, and a first differential-temperature measuring device communicating with said first pair of temperature sensors;
   b. a second pair of vertically-spaced temperature sensors below said feed locus and separated by a second plurality of trays which are greater than said first plurality of trays, and a second differential-temperature measuring device communicating with said second pair of temperature sensors;
   c. first differential-temperature computing means communicating with a selected one of said first and second differential-temperature measuring devices to determine a first differential communicating output, said output being a function of the ratio of said second and said first plurality of trays;
   d. second differential temperature computing means communicating with said first computing means and the non-selected differential temperature measuring device, and co-acting with first control means for regulating the degree of vaporization of said liquid bottoms material returned to said reboiler section;
   e. a third pair of vertically-spaced temperature sensors above said feed locus; and,
   f. a third differential-temperature measuring device communicating with said third pair of temperature sensors and co-acting with second control means for regulating the quantity of reflux returned to said rectification section.

2. The control system of claim 1 further characterized in that one of said second pair of temperature sensors is proximate to said feed locus and the second is proximate to the locus through which said partially vaporized liquid bottoms material is returned to said reboiler section.

3. The control system of claim 1 further characterized in that both of said third pair of temperature sensors are proximate to the locus through which said reflux is returned to said rectifiction section.

4. The control system of claim 1 further characterized in that said second control means directly regulates the quantity of reflux returned to said rectification section and third control means regulates the quantity of said overhead material recovered as a net product stream.

5. The control system of claim 1 further characterized in that said first differential temperature computing means communicates with said first differential temperature measuring means, and said second differential temperature computing means communicates with said second differential temperature measuring means and said first computing means.

6. The control system of claim 1 further characterized in that said first differential temperature computing means communicates with said second differential temperature measuring means, and said second differential temperature computing means communicates with said first differential temperature measuring means and said first computing means.

7. A method for controlling a fractionation column, wherein (i) a feed stream is introduced through a locus intermediate the top and bottom thereof; (ii) liquid bottoms material is recovered from the lower end of said column, and at least a portion thereof is partially vaporized and returned to the reboiler section; and, (iii) vaporous overhead material is recovered from the upper end of said column, condensed and at least a portion thereof returned to the rectification section as a reflux stream, which method comprises the steps of:
   a. sensing a first temperature differential between two vertically-spaced temperature sensing points below said feed locus, separated by a first plurality of trays, measuring the resulting first differential-temperature and generating a first signal representative thereof;
   b. sensing a second temperature differential between two vertically-spaced temperature sensing points below said feed locus, separated by a second plurality of trays which is greater than said first plurality of trays, measuring the resulting second differential temperatue and generating a second signal representative thereof;
   c. multiplying a selected one of said first and second differential temperature signals by a multiplier representing the ratio of the number of trays between the sensors supplying the non-selected differential temperature signal to the number of trays between the sensors supplying said selected differential temperature signal, and generating a third signal representing the resulting product;
   d. obtaining a computed relationship of said third signal and said non-selected signal, and generating a fourth signal representative of the resulting computed relationship;

e. regulating the degree to which said liquid bottoms material is vaporized in response to said fourth signal;

f. sensing a third temperature differential between two vertically-spaced temperature sensing points above said feed locus, measuring the resulting third differential temperature and generating a fifth signal representative thereof; and, g. regulating the quantity of said returned reflux stream responsive to said fifth signal.

* * * * *